United States Patent [19]

Carter et al.

[11] Patent Number: 4,608,460
[45] Date of Patent: Aug. 26, 1986

[54] COMPREHENSIVE AUTOMATIC DIRECTORY ASSISTANCE APPARATUS AND METHOD THEREOF

[75] Inventors: Nicholas J. R. Carter, Shelton; Walter Guilarte, Monroe; Ravindra T. Masand, Shelton; Terrance S. Martin, Stamford; Francisco A. Middleton, Newtown; Santanu Das, Shelton, all of Conn.

[73] Assignee: ITT Corporation, New York, N.Y.

[21] Appl. No.: 651,375

[22] Filed: Sep. 17, 1984

[51] Int. Cl.⁴ ............................................. H04M 3/42
[52] U.S. Cl. ................................. 179/6.11; 179/6.17; 179/18 B
[58] Field of Search ..................... 179/6.01, 6.03, 6.04, 179/6.06, 6.08, 6.07, 6.09, 6.1, 6.13, 6.14, 6.17, 6.18, 6.20, 18 B, 18 BA

[56] References Cited

U.S. PATENT DOCUMENTS

| | | | |
|---|---|---|---|
| 3,728,486 | 4/1973 | Kraus | 179/6.08 |
| 3,793,487 | 2/1974 | Kilby | 179/6.1 |
| 4,152,547 | 5/1979 | Theis | 179/6.14 |
| 4,320,256 | 3/1982 | Freeman | 179/6.08 |
| 4,327,251 | 4/1982 | Fomenko et al. | 179/6.08 |
| 4,357,493 | 11/1982 | Anderson et al. | 179/6.08 |
| 4,420,656 | 12/1983 | Freeman | 179/6.04 |
| 4,475,013 | 10/1984 | Lee et al. | 179/18 BA |
| 4,518,827 | 5/1985 | Sagara | 179/6.14 |

Primary Examiner—Donald McElheny, Jr.
Attorney, Agent, or Firm—Peter C. Van Der Sluys; Robert A. Hays

[57] ABSTRACT

A comprehensive automatic directory assistance apparatus includes a means for receiving information from a caller via a specified number of DTMF signals, means for identifying another subscriber from the signals, means for vocally conveying information relating to the other subscriber to the caller and means, selectable by said caller, for connecting the caller with the other subscriber.

18 Claims, 8 Drawing Figures

COMPREHENSIVE AUTOMATIC DIRECTORY ASSISTANCE APPARATUS AND METHOD THEREOF

BACKGROUND OF THE INVENTION

The present invention generally relates to a comprehensive automatic directory assistance apparatus and, in particular, relates to such an apparatus that is subscriber accessed through a conventional telephone exchange and which receives, as an exclusive input thereto Dual Tone Multi-Frequency, (DTMF) signals and responds, as an exclusive output therefrom, via synthesized voice.

In an effort to reduce operating expenses, telephone communication system suppliers have, in recent times, devoted considerable effort toward developing automated directory assistance systems. The primary goal of such systems is to reduce the need for human operators or switchboard attendants while providing a wide range of services to the subscriber. Most of the present systems, nevertheless, either require at least an initial human response to the calling subscriber or provide limited services. For example, a call presently placed to directory assistance is answered by an operator who accepts the callers request for information and enters that information into a data terminal. The data terminal subsequently responds with the requested number via a voice synthesizing mechanism. There are other conventional caller assistance systems which are located between the callers telephone and the central switching exchange to intercept a call and provide, for example, automatic call routing. Such intercepting systems require that the caller know the number of the person he is calling; otherwise, the call must be passed through the central switching exchange to a human operator.

Still other automatic directory assistance systems require voice recognition by the system. One such system is described in U.S. Pat. No. 3,928,724, entitled "Voice Actuated Telephone Directory Assistance System" issued to Byram, et al. on Dec. 23, 1975. In the system described therein a caller must literally spell the complete last name of the party about whom he is requesting information. The system then provides the requested number by voice synthesis. In the event that more than one last name matching the spelled name exists in the directory, the caller is requested to spell the first name and, in the event of continued duplication the caller is requested to provide an address. Such a system has the drawback that it provides a very limited service and bidirectional dialogue is not possible. In addition, such a system would be difficult for anyone with a speech impediment, or an accent, to utilize. Hence, under such cirumstances, a caller would nevertheless need to be connected to a human operator. Another system requiring spelled vocal input is described in U.S. Pat. No. 4,164,025 issued to Debnowsky, et al. on Aug. 7, 1979.

There are, in addition, numerous systems available using many different types of data searching. These systems, however, require the intervention by an operator. Examples of such systems are described in U.S. Pat. No. 4,104,717 issued to Fujimura; U.S. Pat. No. 4,020,473 also issued to Fujimura; U.S. Pat. No. 3,529,295 issued to Brass, et al., and U.S. Pat. No. 3,242,407 issued to Hagelbarger, et al.

In addition to these more conventional systems, various limited electronic answering services are available, which answering services receive DTMF inputs and provides a callers name and number. Such devices are discussed in U.S. Pat. Nos. 4,117,542 and 4,304,968 issued to Klausner, et al. However, such systems are rather restrictive because of the limited memory available therewith and provide only specific information. Further, because of the limited memory in such devices, expansion into a larger system wherein a large volume of names having the same letters may be present would be quite difficult. Another drawback of such systems is that the input thereto frequently requires a codification of the persons name. That is, if the letter K were to be entered the user would need to depress the #5 keypad twice; the first depression indicating not only the location of the keypad but also the first of the group of letters (i.e. JKL) thereon, the second depression indicating the second position of the particular letter group of the three located thereon. Of course, to enter the letter L would require a third depression of the keypad. Such a system of input is subject to serious potential data entry errors and consequently results in considerable system inefficiency. In addition, such a system requires user training prior to the utilization of the service, i.e., it is not considered user friendly by present standards.

Other systems which provide other, but nevertheless rather limited services, other than telephone number identification, such as direct calling via name insertion, are also known. For example, U.S. Pat. No. 4,341,929 issued to Alexander, et al., describes a dedicated call-by-name system which, upon receiving a spelled name, directly connects the caller to the party whose name was spelled. However, such a system is designed for use by an operator using a full keyboard and hence, does not reduce the expense of providing directory assistance to any or all of the users of the system.

In addition to the above described systems, it is also generally known to provide message centers whereupon a subscriber call call in and, upon entering a specific code, receive messages left for him by other parties. One such system is described in U.S. Pat. No. 4,327,251 issued to Fomenko, et al. Such a message service is, of course, of limited use for a large group of subscribers.

From the above discussion, it is clear that there is a clear and considerable need for an apparatus that provides comprehensive directory assistance service to a subscriber, is easy to access and is ergonomically compatible with the expectation of a majority of users.

SUMMARY OF THE INVENTION

Accordingly, it is one subject of the present invention to provide a comprehensive automatic directory assistance apparatus as well as a method thereof which provides a user with a plurality of options, which options include; requiring a specific fixed amount of information inputted regardless of the actual name of the party about whom information is sought, direct connection of a telephone call; providing the capability of completing a number of search requests, and optional connection to a human operator and immediate reiteration of the found number.

This object is accomplished, at least in part, by a comprehensive automatic directory assistance apparatus including means for providing a caller with a selection of all matches to limited information provided by the caller as well as means for completing the call at the request of the caller and exclusively requiring DTMF inputs from a caller while exclusively responding via synthesized voice.

Other objects and advantages will become apparant to those skilled in the art from the following detailed description read in conjunction with the attached claims and the drawing appended hereto.

DETAILED DESCRIPTION OF THE INVENTION

Figure 1:
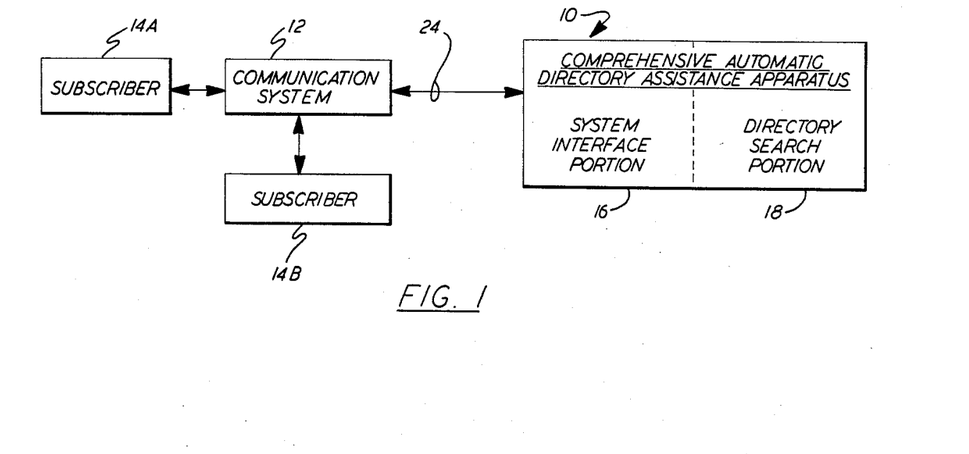
FIG. 1 is a block diagram of a communication system having a comprehensive automatic directory assistance apparatus embodying the principles of the present invention interconnected therewith.

A comprehensive automatic directory assistance apparatus, generally indicated at 10 in FIG. 1 and embodying the principles of the present invention, is interconnected to a communications system 12 having a plurality of subscribers 14 also interconnected thereto. The communication system 12 may be, for example, a private branch exchange (frequently referred to as a PBX). In the preferred embodiment, the apparatus 10 is connected in the same fashion as any other subscriber unit and appears, with respect to the communication system 12, as another subscriber. Each subscriber 14 is represented herein as a conventional telephone unit from which and to which telephone calls can be made by other subscribers to the communication system 12.

The comprehensive automatic directory assistance apparatus 10 as shown in FIG. 1 includes a system interface portion 16 and a directory search portion 18. The system interface portion 16 and the directory search portion 18 are adapted to convey information therebetween via an interface bus 20, shown in FIGS. 2 and 3. The delineation of the portions, 16 and 18, of the apparatus 10 is somewhat arbitrary and is made herein for clarity only and does not imply a specific hardware demarcation, although such can exist.

Figure 2:
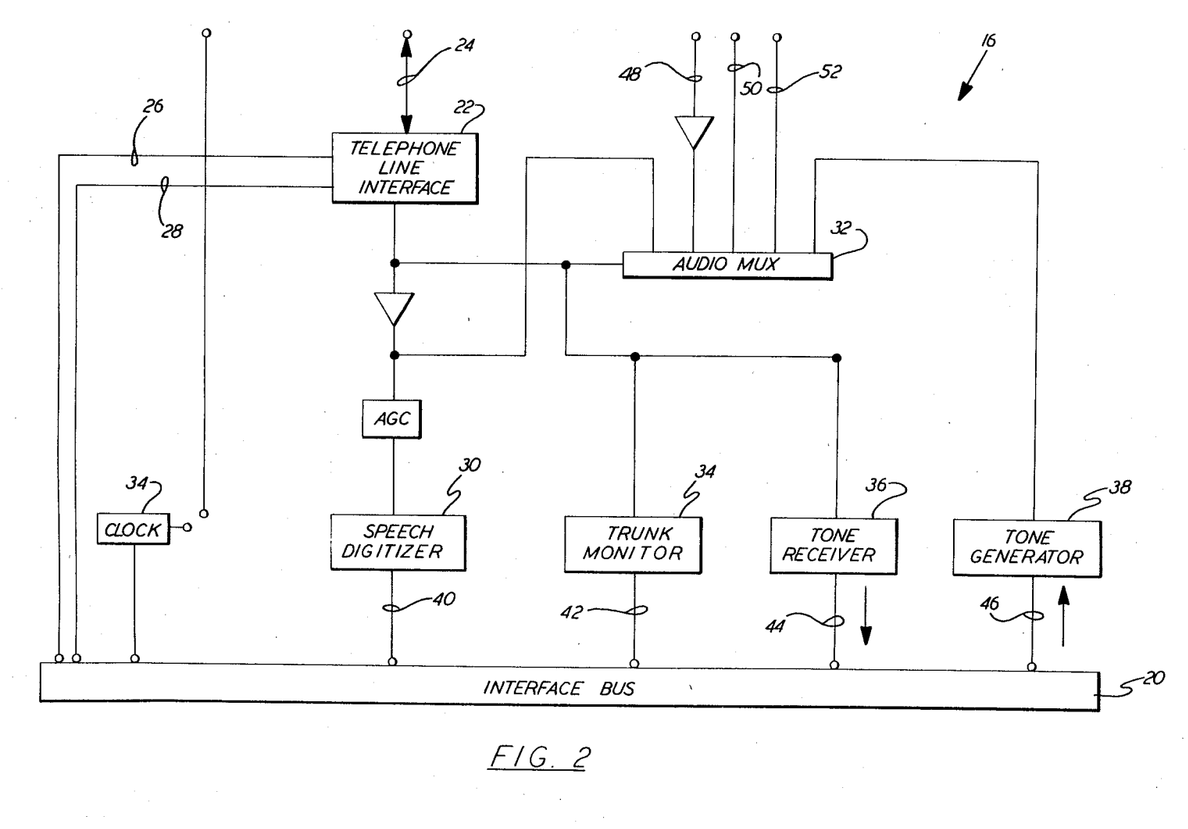
FIG. 2 is a block diagram of the system interface portion of the apparatus shown in FIG. 1.

The system interface portion 16 includes, as shown in the block diagram of FIG. 2, a telephone line interface 22 having a bidirectional communication with the system 12 via communication link 24 and bidirectional communication with the directory search portion 18 of the apparatus 10 via the interface bus 20. Specifically the line interface 22 includes a ring wire 26 and an ON-OFF hook line 28 directly connected to the bus 20. In addition, the system interface portion 16 includes a speech digitizer 30, as used herein the phrase "speech digitizer" is taken to include any means for converting non vocal information a representative vocal rendition thereof, including, but not limited to any synthetic speech mechanism. The system interface portion 16 further includes an audio multiplexer 32, a trunk monitor 34, a tone receiver 36 and a tone generator 38. The speech digitizer 30 and the trunk monitor 34, are in bidirectional communication with the directory search portion 18 via lines 40 and 42, respectively to bus 20. The tone receiver 36 has unidirectional communication from the interface portion 16 to the search portion 18 via line 44 whereas the tone generator 38 has unidirectional communication from the directory search portion 18 via the bus 20 to the interface portion 16 via line 46. For purposes more fully explained below, the audio multiplexer 32 includes an audio, or microphone, input 48, a line input 50 and an auxiliary speaker output line 52. Preferably, the interface portion 16 includes an internal clock 54 which, if desired, can be used to synchronize a plurality of system interface portions 16 so that, for example, a plurality of subscribers 14 can be serviced simultaneously.

Figure 3:
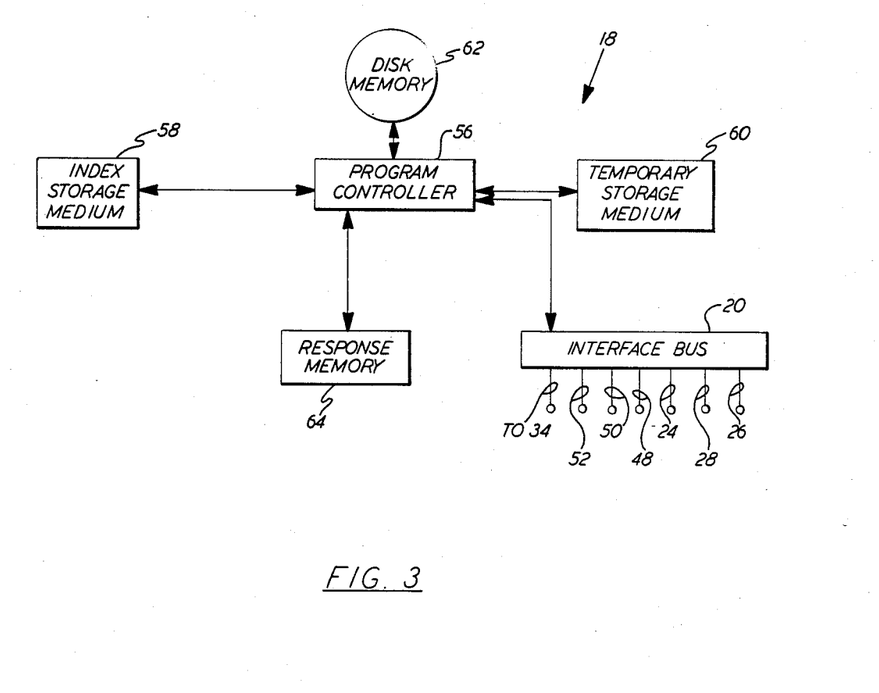
FIG. 3 is a schematic block diagram of the directory search portion of the apparatus shown in FIG. 1.

Referring specifically to FIG. 3, the directory search portion 18 of the apparatus 10 is schematically shown via a block diagram and includes a program controller 56 which preferably is a microprocessor programmed in accordance with the method of providing comprehensive directory assistance. This preferred method is more fully discussed below. The directory search portion 18 further includes an index storage medium 58 which, in the preferred embodiment, is a random access memory, a temporary storage medium 60 which, preferably, is also a random access memory, a rapidly scannable data file 62. Preferably, to avoid the loss of stored information in the event of a power failure, the data file 62 is non-volatile such as, for example, a Winchester disk. The search portion 18 further includes a predictable response memory 64. The program controller 56 interacts with the interface bus 20 via which inputs are received from the interface portion 16 and commands are issued thereto from the controller 56 of the directory search portion 18.

The speech digitizer 30, or voice synthesizer can be, for example, an MC3417 Continuously Variable Slope Delta Modulator/Demodulator, manufactured and marketed by Motorola Inc. The telephone line interface 22, the audio multiplexer 32, the trunk monitor 34, the tone receiver 36 and the tone generator 38 are individually well known in the telecommunication art and, as such, need not be detailed further. In fact, the elements of the interface portion 16, inter alia, are functionally available on a CompuFone ® board, manufactured and marketed by Computalker Parks Division a division of Compuvoice Inc. Some of the functional features of this particular produce are detailed in an article by Randy Reite entitled "Store Speech and Music on Your System"; published in *Microsystems;* May, 1984, pages 44–57.

The search portion 18 of the apparatus 10 can be developed by use of a microcomputer which has a S-100/IEEE-696 board interface, such as, for example, the Heath/Zenith 100 which is a product manufactured and marketed by Zenith Corporation.

In operation, the apparatus 10, as more fully discussed below, receives, exclusively, dual tone multi-frequency inputs from a calling subscriber 14A and outputs, exclusively, synthesized voice renditions to the calling subscriber 14A.

Figure 5A:
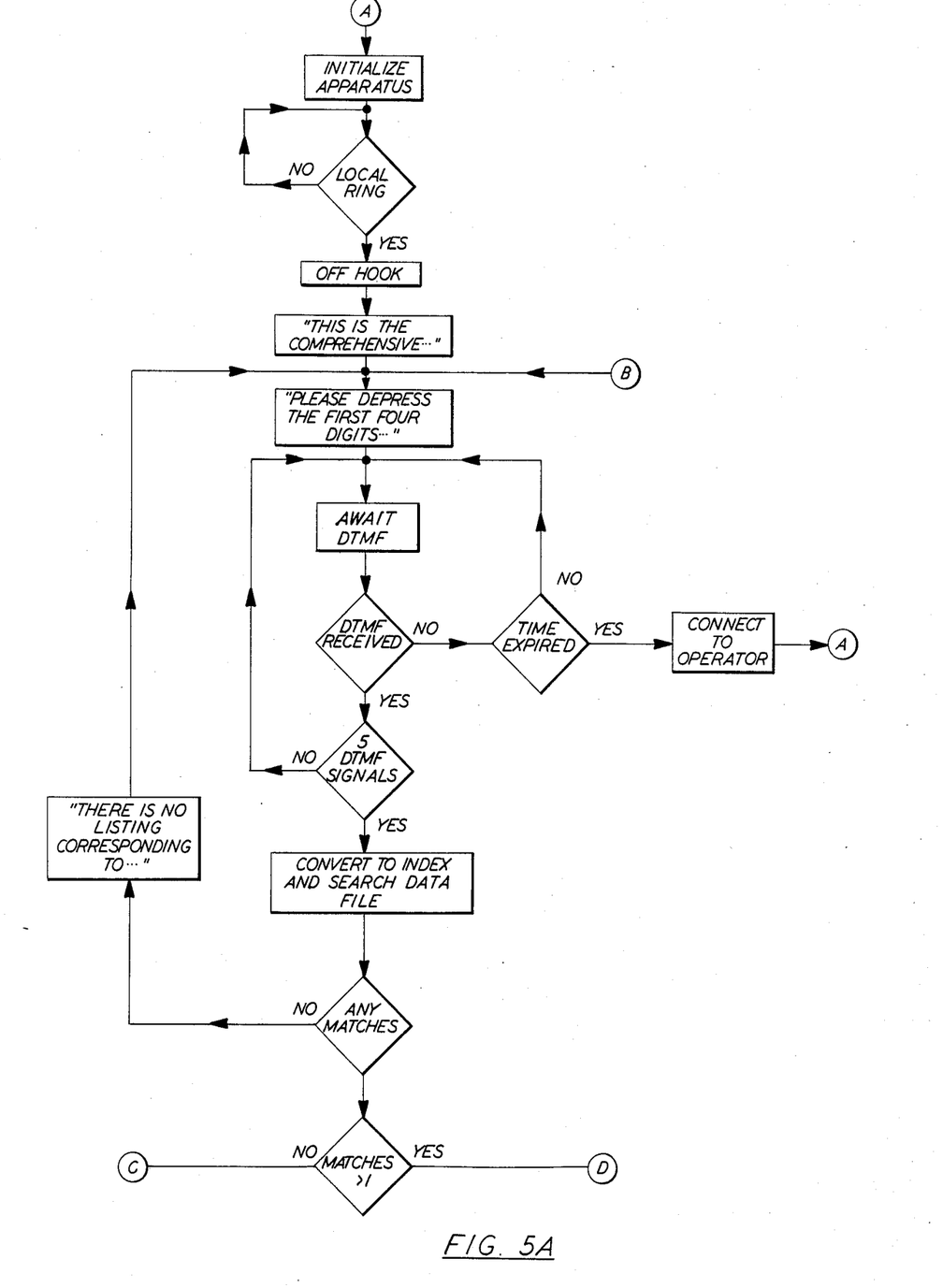
FIGS. 5A, B and C are typical flow diagrams of a method for providing comprehensive directory assistance according to the principles of the present invention.
Figure 5B:
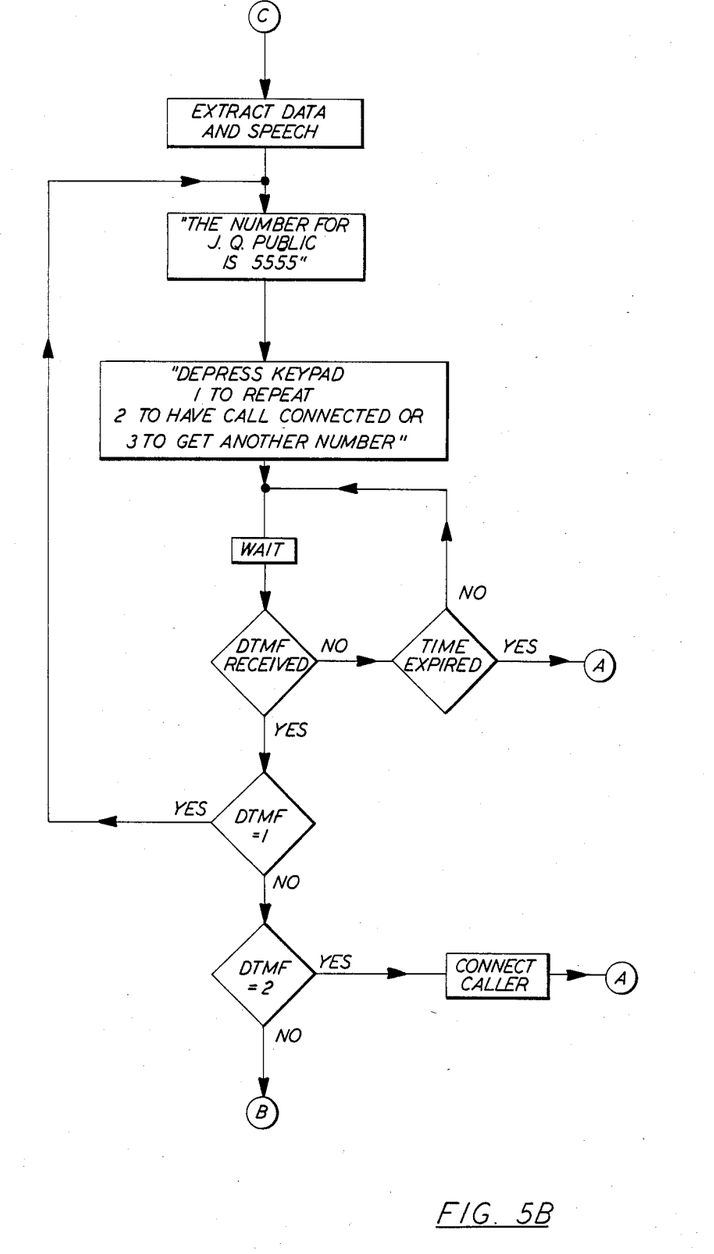
Figure 5C:
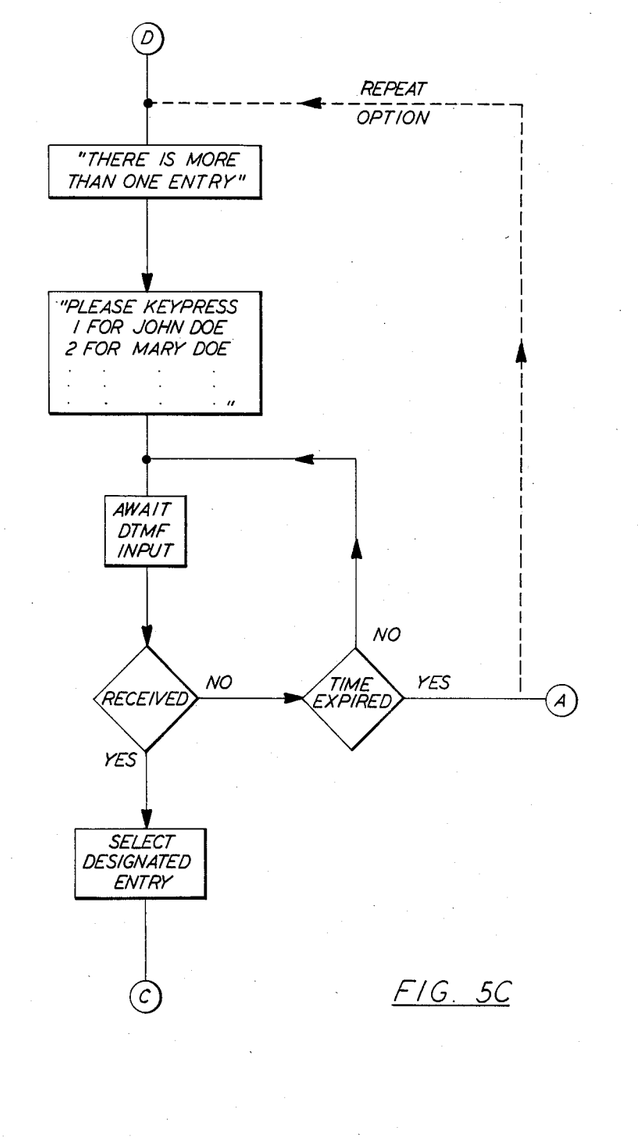

The interaction and functionality of the above described apparatus 10 is more fully discussed, hereinafter, in conjunction with FIGS. 5A, B, and C, with respect to the preferred method for using the apparatus 10.

In the preferred method of providing comprehensive automatic directory assistance, the apparatus 10, when queried by a calling subscriber 14A, receives a signal via the ring wire 26 of the line interface 22 connection and, if it is not otherwise busy, provides a signal, via the ON/OFF HOOK line 28 to the telephone line interface 22 which establishes a communication link with the subscriber 14A via the communication system 12. At this stage, the calling subscriber 14A, is directly connected to the apparatus 10 as though the apparatus 10 were simply another telephone unit (subscriber) attached to the communications system 12. That is, the apparatus 10 and all of its available functions are transparent to the system 12.

The apparatus 10 then provides introductory information to the calling subscriber 14A and receives DTMF signals from the calling subscriber 14A, which signals are provided by the subscriber 14A by depressing the key pads to generate the DTMF signals. In the introductory message the caller 14A is advised to identify the person about whom information is being requested by depressing, once only, the keys carrying the first four letters of the last name and the initial of the first name.

Preferably, to reduce caller waiting time the method allows the calling subscriber 14A to disregard the introductory vocal prompts and begin inputting information immediately. Such may be the case to most effectively utilize the apparatus 10 when the calling subscriber 14A has utilized the apparatus before.

Contrary to prior systems, the calling subscriber 14A only depresses the keypad button containing the letter he wishes to input a single time, regardless of the position of that letter on the keypad. Hence, there is no codification. In addition, the number of inputs, or keypad depressions is strictly limited regardless of the actual number of letters in the name. It has been found that by utilizing the present apparatus 10 the number of duplication identifications, when about 1,000 listings were present in the data file 62, a maximum of four names were indexed for any given entry. More specifically, there were forty seven instances where two names matched a given entry; two instances where three names matched a given entry; and only one instance where four names matched an entry. In fact, it is estimated that even if 10,000 subscribers (about the size of a central office exchange) were listed in the data file 62 the number of input signals required from the user to ergonomically identify a specific subscriber would only be six. That is, the calling subscriber 14A would identify, or provide only one additional letter of a persons last name. This provides an immense ergonomic convenience to users because, first, there is a fixed number of inputs necessary regardless of the length of the name and second, the caller need not know all of a persons name or the correct spelling thereof. For example, if the calling subscriber 14A were only sure of the first 3 or 4 letters of a last name, that information would quite probably be sufficient to provide him with the identification and information desired.

The inputted DTMF tones are routed to the program controller 56 via the tonel receiver 36. The tone receiver 36 converts the DTMF input into a digital signal. This digital signal is then routed via the program controller 56 to the index storage medium 58. The index storage medium 58, which preferably is a random access memory, is pre-programmed to contain a unique data file location item with each index. Thus, the index identifies, for each valid index, one or more specific locations in the data file 62. Consequently, though there may be more than one common index, there is associated with each of these different common indices a unique identifier. For example, if two subscribers have identical names each would have a common index but would nevertheless have different identifiers i.e. they would be stored in two different locations on the data file 62.

In the event that no match is located in the index storage medium 58 the program controller 56 extracts an appropriate response from the predictable response memory 64, such as "There is no listing of that name", and delivers same through the bus 20 to the speech digitizer 30, whereupon the calling subscriber 14A is so informed. As a consequence, a rapid response is provided to the calling subscriber, 14A.

The identifiers corresponding to the inputted name are then fed back to the program controller 56 which, by rapidly scanning the data file 62, retrieves the data stored at each identified location thereon and transfers that data to the temporary storage medium 60.

The data stored in the temporary storage medium 60, after the retrieval is complete, is then routed through the program controller 56 to the speech digitized 30 via the interface bus 20 whereupon a synthetic digitized speech rendition of that information is provided to the caller.

In the event that only a single match is found, the program controller 56 routes that information to the interface bus 20 after extracting a pre-programmed response from the predictable response memory 64, such as, "The number for "name" is - - - " then the digitized response is converted into a vocal rendition so that the calling subscriber 14A is provided with the information desired. In this manner, i.e. by providing a vocal response of the name as well as the number, both the correctness of both the search and the entry are confirmed. But for this feature, an erroneous entry may go undetected.

In the event that a plurality of matches are found the program controller 56 provides those matches but with a different predictable response, also stored in the predictable response memory 64. An example of this would be if there were two Smiths each having a first initial J. The program controller 56 would select the proper response from the predictable response memory 64 and coordinates its delivery with the individual data from the temporary storage medium 60. One such response might be "Please keypress 1. for Jane Smith, 2. for John Smith". In this fashion, the calling subscriber 14A is asked to select which, if any, of the matches he wishes further information on. This avoids requiring the calling subscriber 14A to supply further information. Upon a responsive keypress the specific choice of information is conveyed back to the program controller 56 which then with an appropriate response for the response memory 64 selects the specified item from the temporary storage medium 60 and delivers it via the speech digitizer 30 to the calling subscriber 14A.

In the preferred embodiment, prior to requiring the calling subscriber 14A to respond to the provided basic information desired, such as the telephone number, the calling subscriber 14A is advised via a preprogrammed response from the response memory 64, of other options available. Ergonomically, the three best options are: 1. Provide the opportunity to again request information relating to a subscriber; 2. Have the call completed to the identified subscriber by the apparatus 10, and 3. Have the information resulting from the extracted matches repeated. In the event the caller selects the option of having his call completed, the program controller 56, via the interface bus 20, delivers the digitized form of the telephone number to be called to the tone generator 38. The tone generator 38 converts the digitized signal to a DTMF signal and, via the system defined procedure for call transfers, such as Hook-Flash a signal provided along the on/off hook line 28 then dial, calls the number requested. The calling subscriber 14A is thereupon connected through the communications system 12 to the second subscriber and the communication link between the calling subscriber 14A and the apparatus 10 is severed.

In any such directory assistances apparatus ergonomics are of major consideration. For example, a caller utilizing the apparatus must be responded to relatively quickly, and with minimum inconvenience. In addition, the vocal response must be of an acceptable quality. In the apparatus 10 this includes the avoidance of an excessive list of matches or any extended waiting period. The method for use of the apparatus 10 is designed so that a minimal number of matches are possible while, simultaneously, minimizing the number of input information required. Hence, the present apparatus 10 and the method of using same fully satisfy the ergonomic requirements.

In addition, ergonomics demand that more options be available to a caller. Thus, the apparatus 10 provides a caller with the options which include, providing information about a plurality of other subscribers and the opportunity to have the call connected. In addition, the apparatus 10 includes an internal timing system whereby a caller is automatically connected to a human operator in the event that he is calling via a rotary dial telephone, or alternatively, if, for any reason, he fails to understand or respond to any request for DTMF input signals within a prespecified time interval.

Figure 4A:
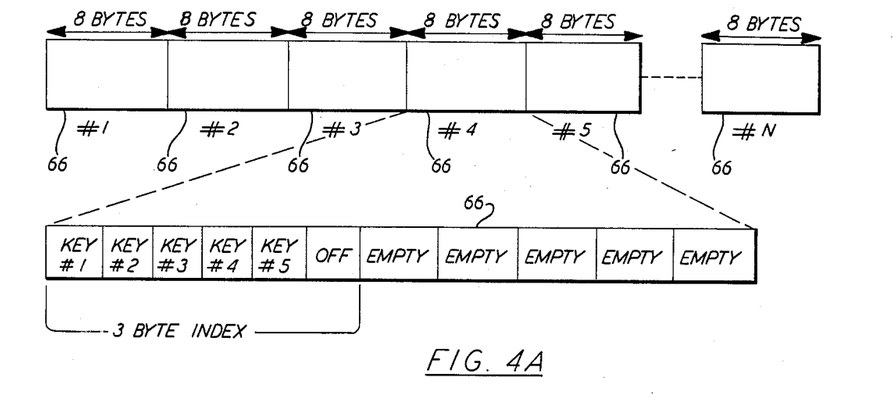
FIGS. 4A and B are illustrative schematics of data information segments useful in conjunction with the control means shown in FIG. 3.

The response time of the apparatus 10 is ergonomically enhanced by the format of the data storage within the program controller 56. Specifically, the search begins with the index storage medium 58 to identify particular, or unique, positional identifiers which are then used to extract information from the mass storage data file 62. Such a two-step process is advantageous since the index storage medium 58, in the preferred embodiments is a random access memory that can be searched in a relatively short time whereas an entire disk memory search would take considerably longer. As an example, and referring to FIG. 4A, the RAM index storage medium 58 is organized according to 8 byte information blocks 66. In the present embodiment, i.e. requiring only 5 separate inputs from a caller, only the first 3 bytes are used in any given 8 byte index. In fact, as shown in FIG. 4A, the first 5 inputs from the DTMF receiver correspond to the first 5 positions of each of the first 3 bytes of an 8 byte data set. The entries in data file 62 are preferably stored in the same relative location as their entry in the index storage medium 58 and are identical in size. Thus, once the relative location of the index entry is found, the location in data file 62 is directly known. Other indexing methods can also be employed.

Figure 4B:
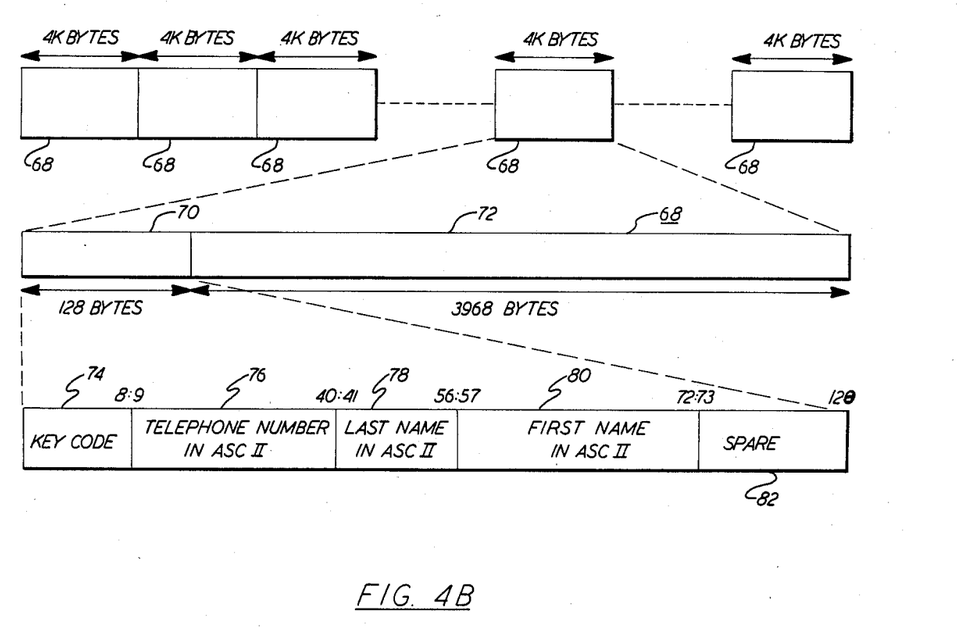

Since, in this embodiment, only 3 bytes are required the remaining 5 bytes are available for other purposes such as, storing a phone number. In such a case, by use of a predetermined prefix, such as * or #, the entry of a phone number could be used to derive the name of a party. Alternatively, a party's phone number history, in situations where there is a considerable amount of personnel movement, could be stored and used as an additional index. As shown in FIG. 4B, each data item in the data file 62 consists of 4 kilobytes, the first 128 bytes 70 of which contain digitized data relating to an index whereas the remaining 3,968 bytes 72 represent digitized speech. In addition, each 128 bytes of data include the first 8 bytes 74 which are the positional code. The 9th through 40th bytes 76 represent the phone number in ASCII code, the 41st through 56th bytes 78 are used to identify the last name is ASCII code and the 57th through 72nd 80 bytes are used to identify the first name is ASCII code, the remainder being spare storage 82. Such an arrangement offers the advantage of utilizing these 128 bytes of data to rapidly generate directories, which could be transferred to a hard copy device, merely by scanning the first 128 bytes of each 4 kilobyte segment of the data file 62. Consequently, directories or other hard copy lists may be created without having to provide someone to listen to each name on the data file 62.

An additional feature of the apparatus 10 is the ability to broadcast messages, for example, throughout a building. Such a feature can be initiated in an embodiment by the program controller 58 signalling the trunk monitor 34 to first ascertain the activity of the system 12. Upon receipt of a "no activity" input from the truck monitor 34, the program controller 56 then extracts a preselected message from the response memory 64 and provides the message, via the speech digitizer 30, to the speaker output line 52. Alternatively. the preselected message, because of the length thereof, may be stored on the data file 62 and broadcast via either the temporary storage medium 60 or the predictable response memory 64. For example, such messages could be announcements, weather information or the like.

The apparatus 10 further includes means for updating or updating information located in the data file 62. The updating means includes use of the audio input line of the interface portion 16 which allows digitized voice signals to be added to the data file 62.

Preferably, updating is performed via a telephone line because of the audio band limiting nature of the telephone system. Hence, the input, i.e. the updating, is then in the best digitized and audio form for outputting to a caller via the telephone line. Nevertheless, a separate microphone can be utilized along with an auxillary speaker, which speaker can be used to provide instructions from a data file update program whereby the updater would be cued and speech inputted to the apparatus controlled. Such control is necessary to ensure that only 3,968 bytes are utilized for the audio portion of each parties name used on the disk. In real time, with currently available voice coding methods, this is a little under 2 seconds. Consequently, when an updating is taking place, the person performing the updating must be prepared to respond correctly to the cues so that other data is not erased from the data file 62.

As described herein, the present apparatus 10 provides many advantages to a subscriber, not the least of which include directly connecting a telephone call by use of only a specific number of inputs, regardless of the length of the name of the party to be called, the opportunity to make more than a single inquiry as well as being able to select one of numerous matches without having to input any further data about the particular person being called. In addition, the present apparatus 10 can be employed as an automatic night attendant or an automatic call overflow attendant. This could be implemented at any particular private business exchange without the need for support from the local central office.

The present apparatus, and a method for providing comprehensive automatic directory assistance has been described with respect to an exemplary embodiment which is not deemed to be limiting as other designs may be made by persons skilled in the art without departing from the spirit and scope hereof. Hence, the present invention is deemed limited by the appended claims and the reasonable interpretation thereof.

What is claimed is:

1. Apparatus for automatically providing comprehensive assistance to a calling subscriber of a communication system having a plurality of subscribers interconnected thereto; said apparatus comprising:
means for establishing a communication link with said calling subscriber, said establishing means being responsive to a conventional system call made by said subscriber;
means for accepting, via said communication link, a prespecified number of tonal inputs from said calling subscriber, said prespecified number being generally less than the length of a name of interest, each said tonal input being representative of a letter corresponding to one letter of said name of interest to said calling subscriber, said accepting means also having default means associated therewith for automatically transferring said calling subscriber to an operator upon failure of said accepting means to receive said tonal inputs;
means for digitizing said tonal inputs;
a storage medium having a plurality of indices stored therein, each one of said plurality of indices being a digitized representation of said prespecified number of letters of the name of each said plurality of subscribers and having a unique identifier associated therewith, each identifier being representative of a different one of said plurality of subscribers whereby said unique identifiers associated with any one particular index can be accessed;
a scannable data file, said data file having a plurality of items stored therein, each of said plurality of items having an identifier portion and a speech digitized portion, said speech digitized portion including information for said calling subscriber;
a temporary storage medium;
a program controller for controlling said tonal input digitizing means for converting said tone inputs from said calling subscriber to a digitized index, searching said storage medium for all said identifiers associated with said index, retrieving from said data file each so identified item and storing said identified items in said temporary storage medium; and
means, responsive to said controller, for providing said subscriber with a vocal rendition of each one of said identified items stored in said temporary storage medium.

2. Apparatus as claimed in claim 1 wherein said means for establishing a communication link includes a telephone interface having bidirectional communication with said communication system and said program controller whereby a ring signal is provided to said program controller and, in response thereto, said program controller provides a command to said telephone interface to establish said communication link via an ON/-OFF hook line.

3. Apparatus as claimed in claim 2 wherein said scannable data file includes a hard disk storage medium.

4. Apparatus as claimed in claim 3 wherein said storage medium and said temporary storage medium are random-access-memories.

5. Apparatus as claimed in claim 1 wherein said scannable data file includes a hard disk storage medium.

6. Apparatus as claimed in claim 1 wherein said scannable data file includes a hard disk storage medium and said temporary storage medium is a random-access-memory.

7. Apparatus as claimed in claim 1 further comprising:
a response memory having stored therein a plurality of predictable reponses, said predictable responses being stored in digitized form compatable with said vocal rendition providing means.

8. Apparatus as claimed in claim 7 wherein said storage medium, said temporary storage medium, and said response memory are random-access-memories.

9. Apparatus as claimed in claim 1 further comprising;
means for establishing a connecting communication link between said calling subscriber and another one of said plurality of subscribers.

10. Apparatus as claimed in claim 9 wherein said connecting communication link establishing means includes a tone generator for transforming digital signals from said program controller to DTMF signals.

11. Apparatus as claimed in claim 10 wherein said connecting communication link establishing means further includes means for conveying said DTMF signals from said tone generator to said communication system.

12. Apparatus as claimed in claim 1 further comprising:
means for monitoring said communication system for activity by subscribers thereto.

13. Apparatus as claimed in claim 1 further comprising;
means for entering an item onto said scannable data file, said entering means having the same audio bandwidth characteristics as said communication system.

14. Apparatus as claimed in claim 1 further comprising;
means for establishing communication links with a plurality of calling subscribers while servicing said calling subscriber.

15. A method for providing comprehensive directory assistance to a calling subscriber of a communication system having a plurality of subscribers interconnected thereto; said method comprising the steps of:
establishing, in response to a conventional system call, a communication link with said calling subscriber;
accepting, after establishing said communication link, only a prespecified number of DTMF inputs from said calling subscriber said prespecified number being generally less than the length of a name of interest and each DTMF input being representative of a letter corresponding to one letter of said name of interest or in the absence of said DTMF inputs connecting said calling subscriber to an operator;
converting said accepted inputs to an index and comparing said index with a plurality of indices each having a unique identifier associated therewith;
scanning a data file having a plurality of items stored thereon each of said plurality of items having a unique identifier associated therewith, each of said plurality of items also having a digitized speech portion;

extracting each matched item from said data file and storing said matched items in a temporary storage medium;

providing said calling subscriber with a synthetic voice rendition of each one of said matched items stored in said temporary storage medium.

16. Method as claimed in claim 15 further comprising the step of:

determining if any data file identifier has an index matching said converted inputs.

17. Method as claimed in claim 15 further comprising the step of:

counting the number of matched items; and selecting, from a response memory, an appropriate digitized speech response to said calling subscriber.

18. Method as claimed in claim 17 further comprising the step of:

providing, after said selecting step, said calling subscriber with the choice of either rehearing said voice rendition, having the call completed or requesting information about one of said plurality of subscribers.

* * * * *